United States Patent
Kwon et al.

(10) Patent No.: US 11,312,407 B2
(45) Date of Patent: Apr. 26, 2022

(54) VEHICLE STEERING COLUMN

(71) Applicant: MANDO CORPORATION, Gyeonggi-do (KR)

(72) Inventors: HyunBi Kwon, Gyeonggi-do (KR); Sang Hyun Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 72 days.

(21) Appl. No.: 16/706,604

(22) Filed: Dec. 6, 2019

(65) Prior Publication Data

US 2020/0180676 A1 Jun. 11, 2020

Related U.S. Application Data

(60) Provisional application No. 62/777,034, filed on Dec. 7, 2018.

(30) Foreign Application Priority Data

Sep. 18, 2019 (KR) .......................... 10-2019-0114633

(51) Int. Cl.
 *B62D 1/184* (2006.01)
 *B62D 1/185* (2006.01)
 (Continued)

(52) U.S. Cl.
 CPC ............. *B62D 1/192* (2013.01); *B62D 1/184* (2013.01); *B62D 1/185* (2013.01); *F16F 7/123* (2013.01); *F16F 7/125* (2013.01); *B62D 1/187* (2013.01)

(58) Field of Classification Search
 CPC ........ B62D 1/184; B62D 1/185; B62D 1/192; B62D 1/19; B62D 1/187; B62D 1/195;
 (Continued)

(56) References Cited

U.S. PATENT DOCUMENTS

2016/0368524 A1* 12/2016 Tinnin ................... B62D 1/192
2017/0320513 A1* 11/2017 Dubay ................... B62D 1/184
(Continued)

FOREIGN PATENT DOCUMENTS

CN 201264641 7/2009
CN 104943728 9/2015
(Continued)

OTHER PUBLICATIONS

Office Action dated Nov. 3, 2021 for Chinese Patent Application No. 201911248431.9 and its English translation from Global Dossier.

*Primary Examiner* — Keith J Frisby
(74) *Attorney, Agent, or Firm* — Ladas & Parry, LLP

(57) ABSTRACT

Provided is a vehicle steering column. A lower column has an open area, an axial slot provided in a central portion of the open area, a connecting portion connecting portions of the lower column located on both sides of the open area, a cut portion corresponding to the slot and provided on one side of the connecting portion, and a pair of protruding opposite end portions. A hinge pin is fitted into the opposite end portions of the lower column. An upper column is fitted into the lower column. A telescopic fixing plate of the upper column is provided in a location corresponding to the slot, and has a plurality of catch recesses spaced apart from each other. A telescopic catch member is located in the cut portion between the opposite end portions to be rotatably supported by the hinge pin, and has a catch protrusion engaging with the catch recesses.

20 Claims, 14 Drawing Sheets

(51) Int. Cl.
  *B62D 1/19*   (2006.01)
  *F16F 7/12*   (2006.01)
  *B62D 1/187*  (2006.01)

(58) Field of Classification Search
  CPC ..... B62D 1/18; F16F 7/123; F16F 7/12; F16F 7/125
  USPC ............................................ 74/493; 280/775
  See application file for complete search history.

(56)         References Cited

U.S. PATENT DOCUMENTS

2018/0111640 A1* 4/2018 Bodtker ................. B62D 1/189
2019/0161108 A1* 5/2019 Kwon .................... B62D 1/192

FOREIGN PATENT DOCUMENTS

| CN | 105416379 | 3/2016 |
| CN | 107571908 | 1/2018 |
| CN | 108357559 | 8/2018 |
| KR | 10-2018-0070820 | 6/2018 |

\* cited by examiner

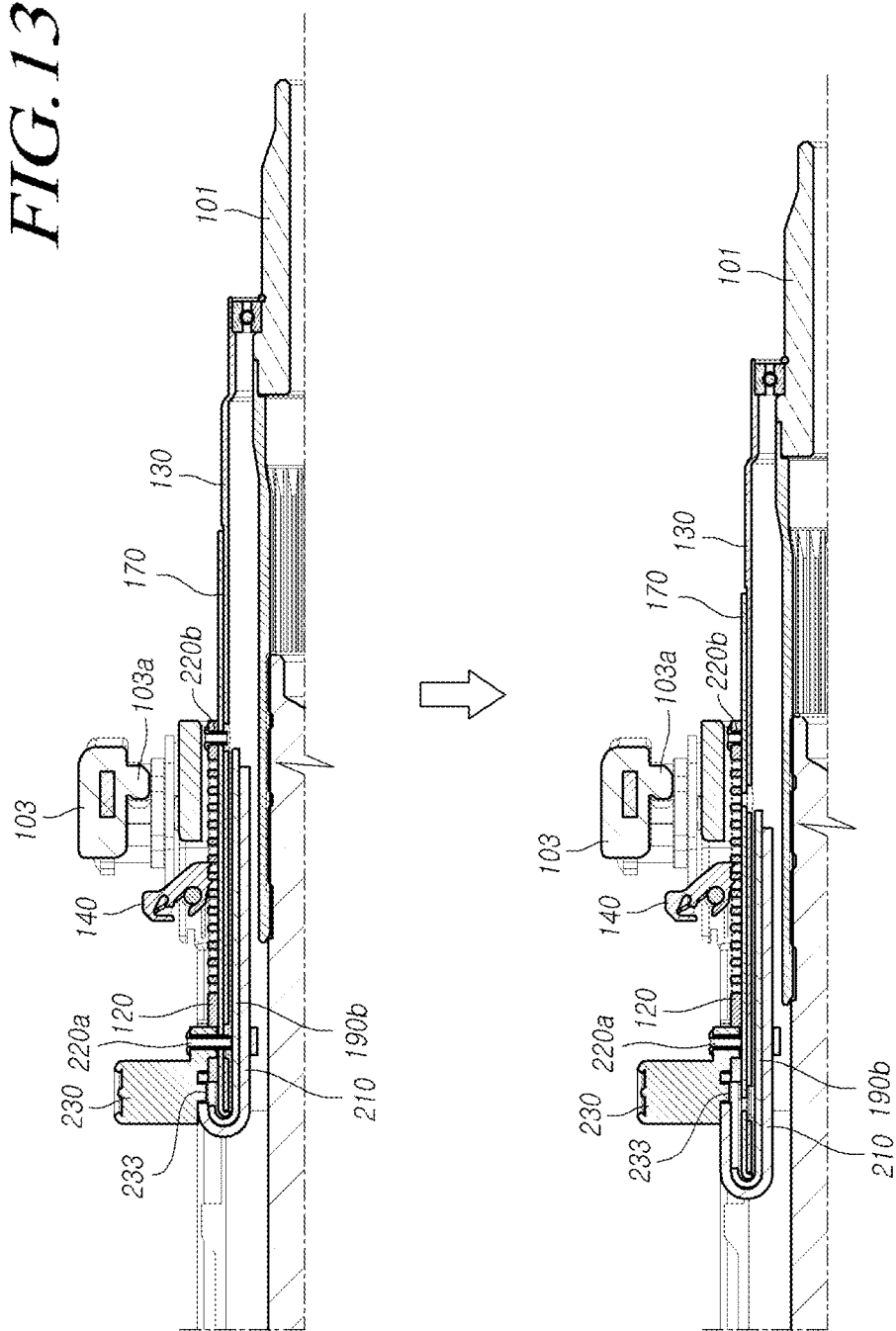

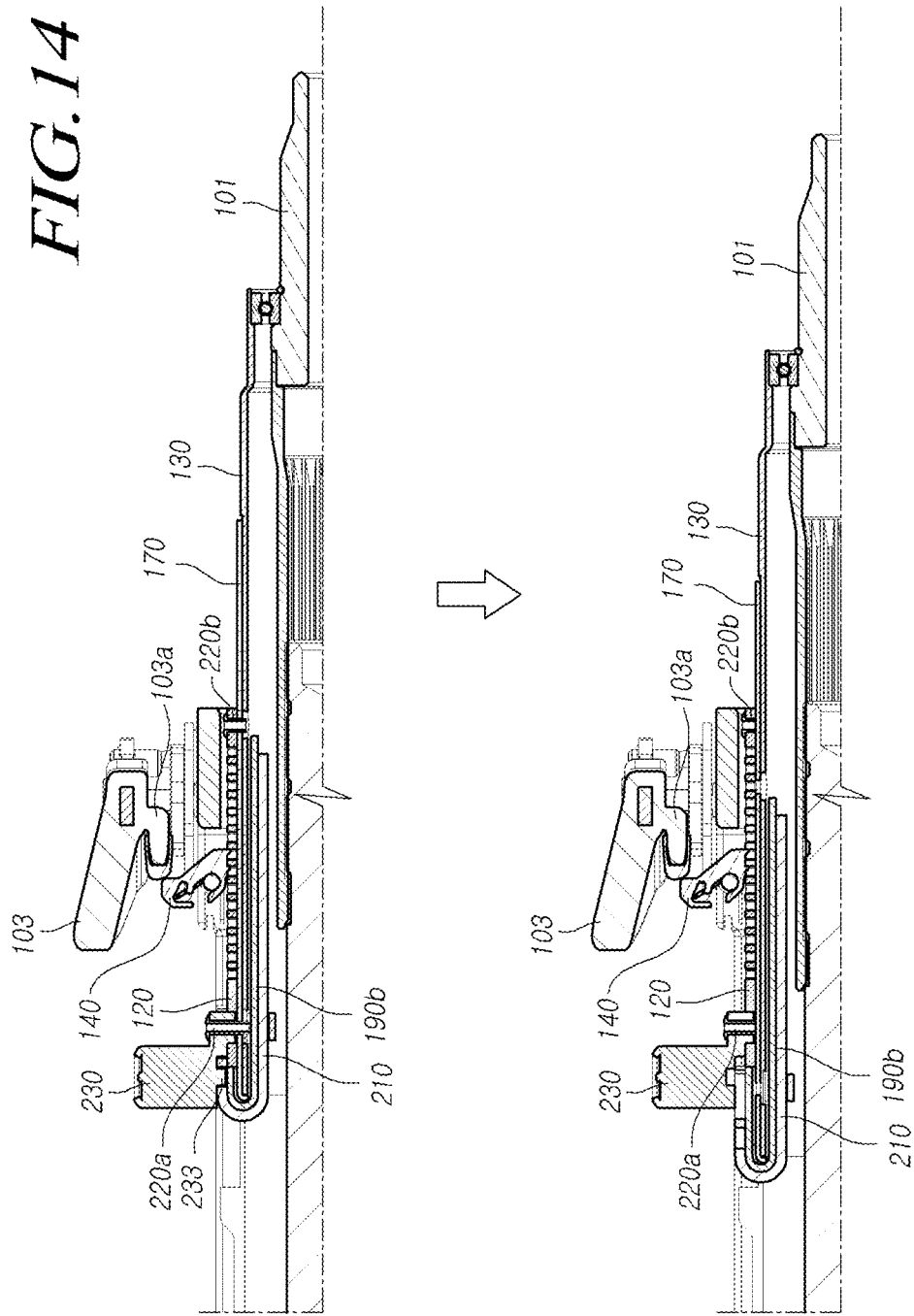

VEHICLE STEERING COLUMN

CROSS REFERENCE TO RELATED APPLICATIONS

This application claims the benefit of U.S. Provisional Application No. 62/777,034, filed on Dec. 7, 2018, and the priority to Korean Patent Application No. 10-2019-0114633, filed on Sep. 18, 2019, which are hereby incorporated by reference for all purposes as if fully set forth herein.

BACKGROUND

Technical Field

Embodiments of the present disclosure generally relate to a vehicle steering column. More particularly, some embodiments of the present disclosure relate to a vehicle steering column having a structure by which components for a telescopic operation and components for collapsing the steering column in the event of a crash efficiently operate without interfering with each other while having compact sizes. In addition, the adjustment of a collapsing load of the steering column in the event of a crash is facilitated, and at the same time, the collapsing load is adjusted according to the type-specific collision properties of vehicles, thereby improving collision performance. It is possible to reduce the number of components, simplify an assembly process, and reduce fabrication costs.

DESCRIPTION OF RELATED ART

In general, a vehicle steering column has a telescoping and tilting function, by which a driver can adjust a degree of protrusion and a tilt angle of a steering wheel according to the driver's height or body type in order to facilitate a steering operation.

In addition, such a vehicle steering column has a problem in that a separate structure and a plurality of components should be provided to allow collision energy absorbing components to be mounted on the steering column. For example, the collision energy absorbing components may include a capsule coupled to a mounting bracket to absorb collision energy in the event of a crash, a tearing plate, a bending plate, and the like. In addition, since these components are separately fabricated and then assembled together, the number of related components and process steps are increased.

In addition, according to the shock absorbing solution using a tearing groove, in which a recess having a predetermined depth is formed during the absorption of a secondary load by the tearing plate after the absorption of a first load by the tearing of the capsule, the fabrication of products may be complicated, and vertical deformation may lead to a horizontal deviation of the load by inference with adjacent components.

It is with respect to these and other general considerations that the following embodiments have been described. Also, although relatively specific problems have been discussed, it should be understood that the embodiments should not be limited to solving the specific problems identified in the background.

BRIEF SUMMARY

Various embodiments of the present disclosure may propose a vehicle steering column having a structure by which components for a telescopic operation and components collapsing in the event of a crash efficiently operate without interfering with each other while having compact sizes.

Some embodiments of the present disclosure may propose to facilitate the adjustment of a collapsing load of the steering column in the event of a crash is facilitated while adjusting the collapsing load according to the type-specific collision properties of vehicles, thereby improving collision performance. Accordingly, the number of components may be reduced, an assembly process may be simplified, and fabrication costs are reduced.

Some embodiments provide a vehicle steering column including: a lower column having an open area provided in an outer circumferential portion of the lower column, an axial slot provided in a central portion of the open area, a connecting portion provided on one end portion of the lower column to connect portions of the lower column located on both sides of the open area, a cut portion corresponding to the slot and provided on one side of the connecting portion, and a pair of opposite end portions protruding to face each other in a diameter direction of the lower column, with a hinge pin being fitted into, while extending through, the opposite end portions; an upper column fitted into the lower column, and including a telescopic fixing plate provided on an outer circumferential surface portion of the upper column, in a location corresponding to the slot, the telescopic fixing plate having a plurality of catch recesses spaced apart from each other in an axial direction; and a telescopic catch member located in the cut portion between the opposite end portions to be rotatably supported by the hinge pin, and having a catch protrusion engaging with the catch recesses.

The object of the present disclosure is not limited to the aforementioned description, and other objects not explicitly disclosed herein will be clearly understood by those having ordinary knowledge in the technical field, to which the present disclosure pertains, from the description provided hereinafter.

DESCRIPTION OF DRAWINGS

The above and other objects, features, and advantages of the present disclosure will be more clearly understood from the following detailed description, taken in conjunction with the accompanying drawings, in which:

FIGS. 13 and 14 are partial cross-sectional views illustrating collapse sliding of the vehicle steering column according to embodiments.

DETAILED DESCRIPTION

Figure 1:
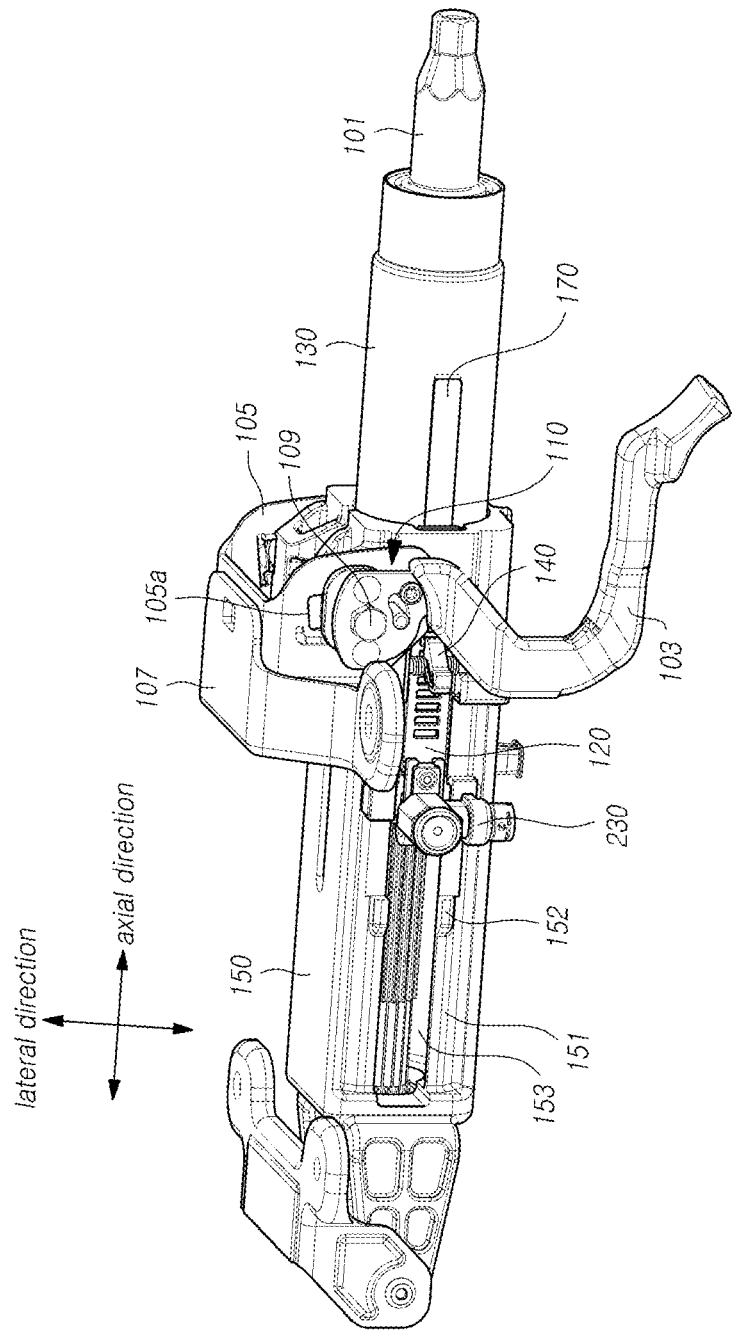
FIG. 1 is a perspective view illustrating a vehicle steering column according to embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of embodiments, a detailed description of known functions and configurations incorporated herein will be omitted in the situation in which the subject matter of embodiments may be rendered rather unclear thereby.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Figure 2:
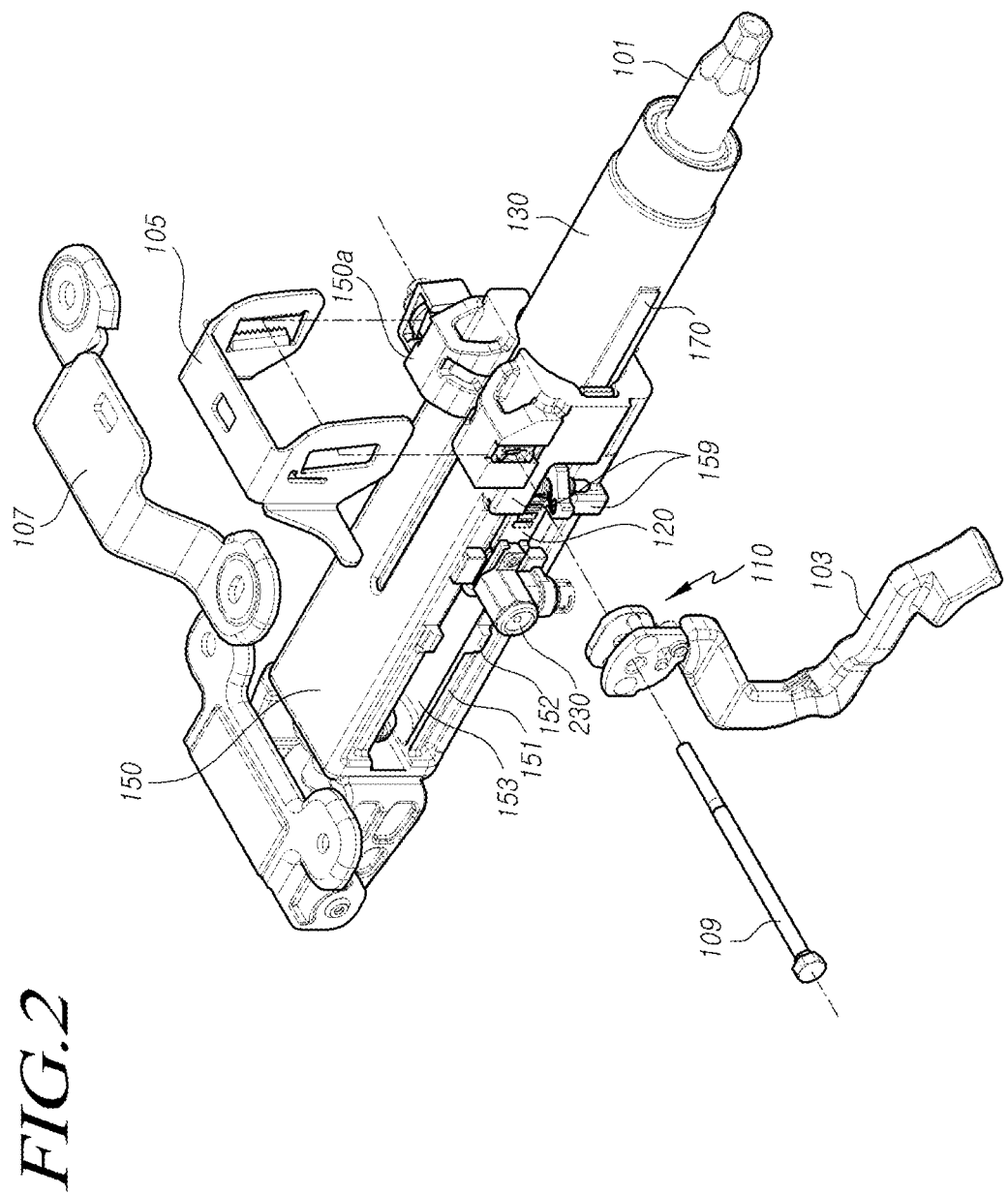
FIG. 2 is an exploded perspective view of FIG. 1.
Figure 3:
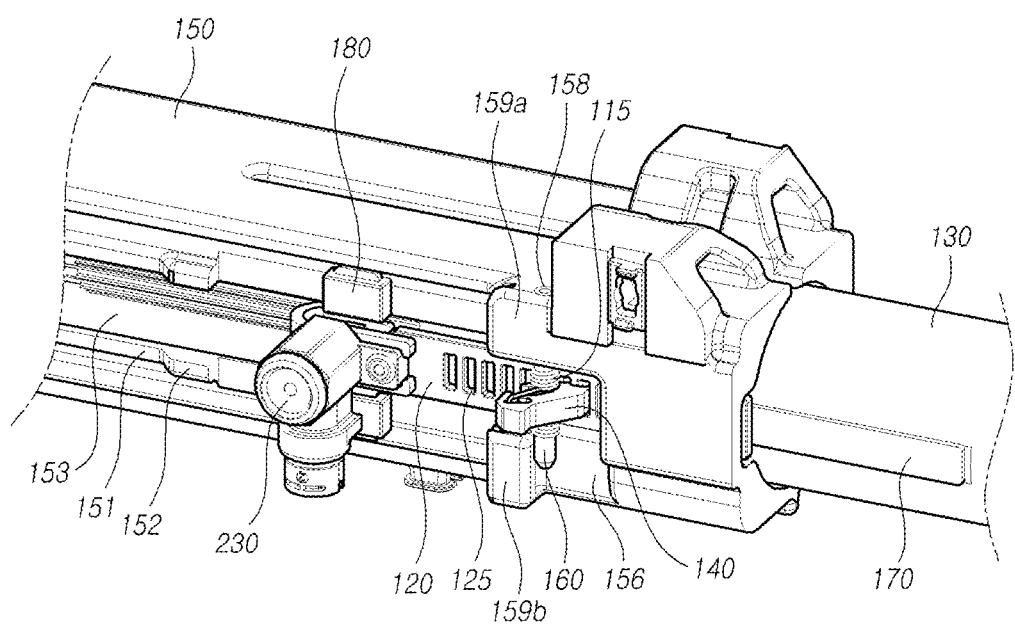
FIGS. 3 and 4 are perspective views illustrating portions of the vehicle steering column according to embodiments.
Figure 4:
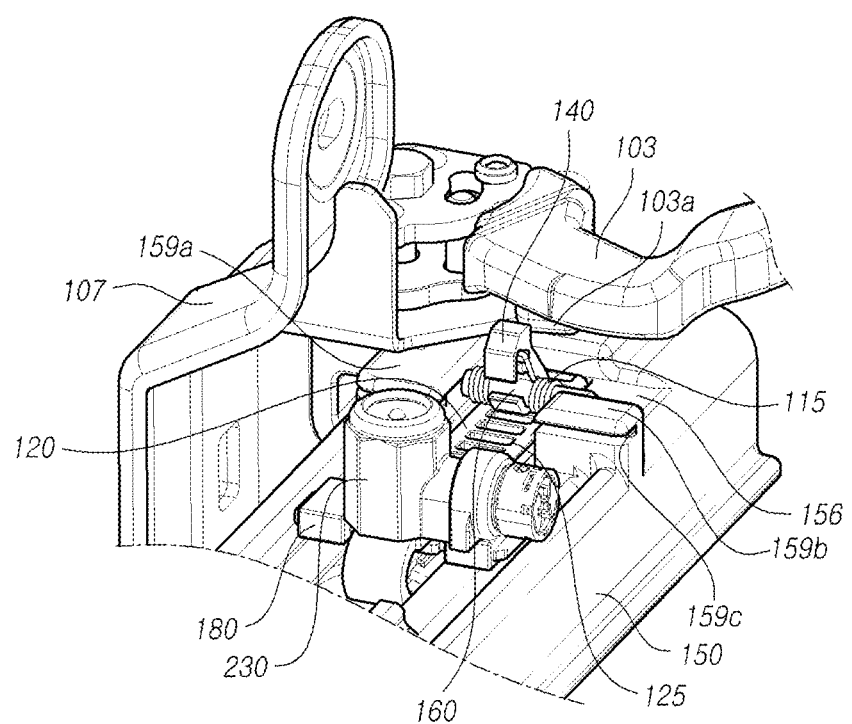
Figure 5:
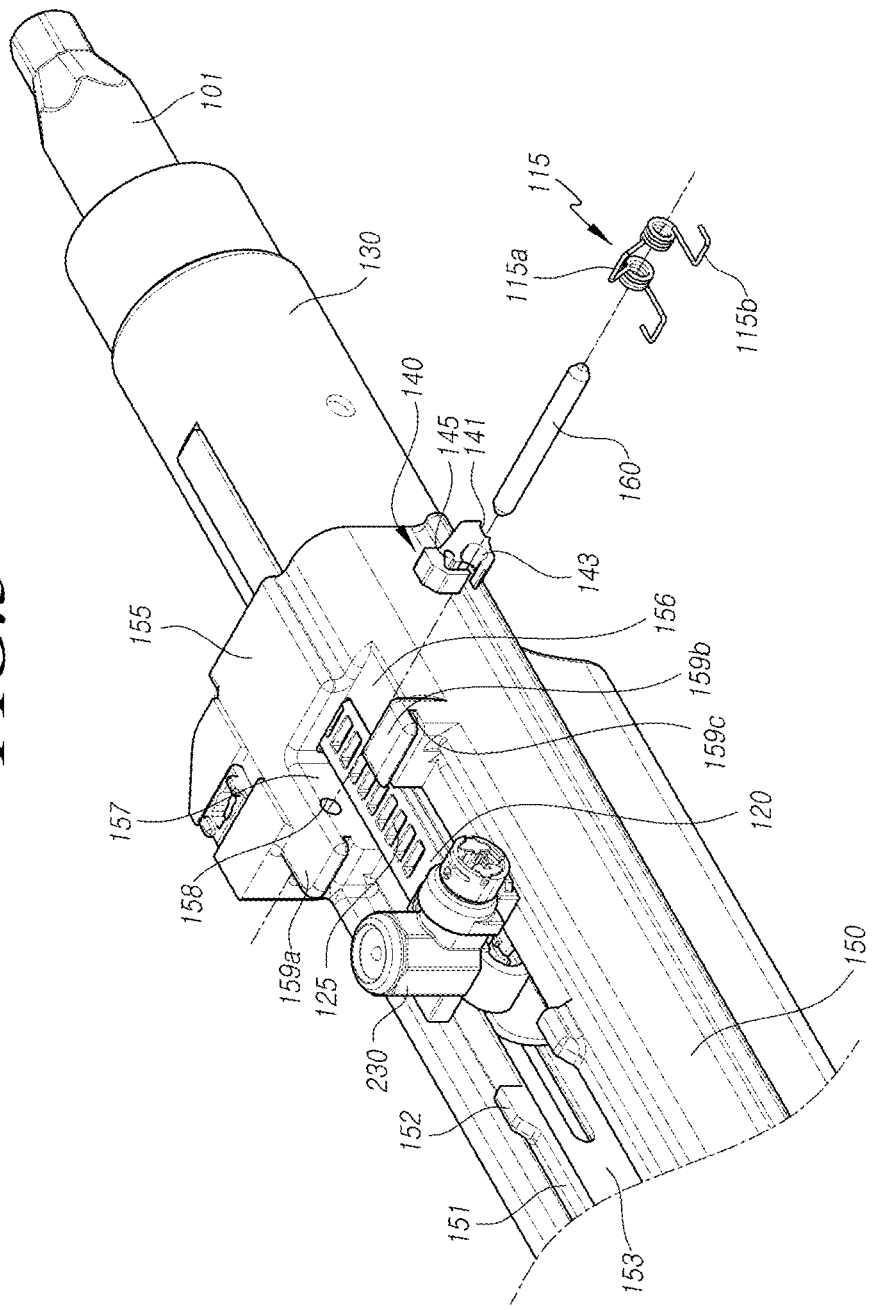
FIG. 5 is an exploded perspective view illustrating portions of the vehicle steering column according to embodiments.
Figure 6:
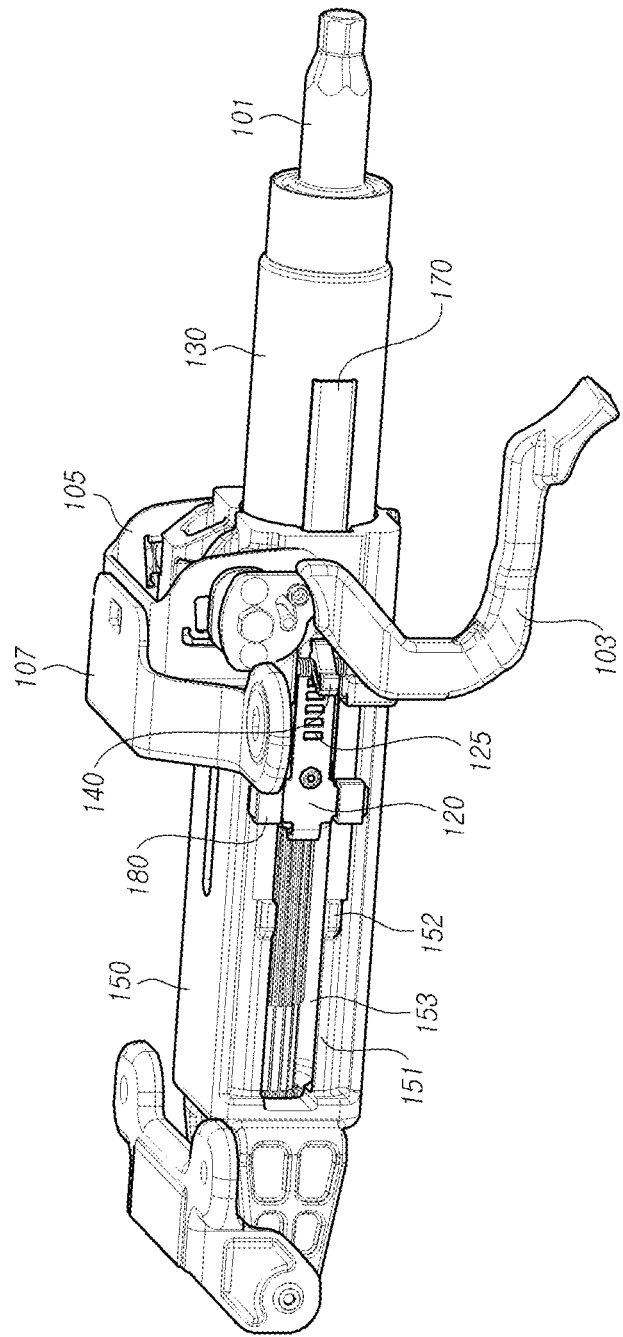
FIG. 6 is a perspective view illustrating the vehicle steering column according to embodiments.
Figure 7:
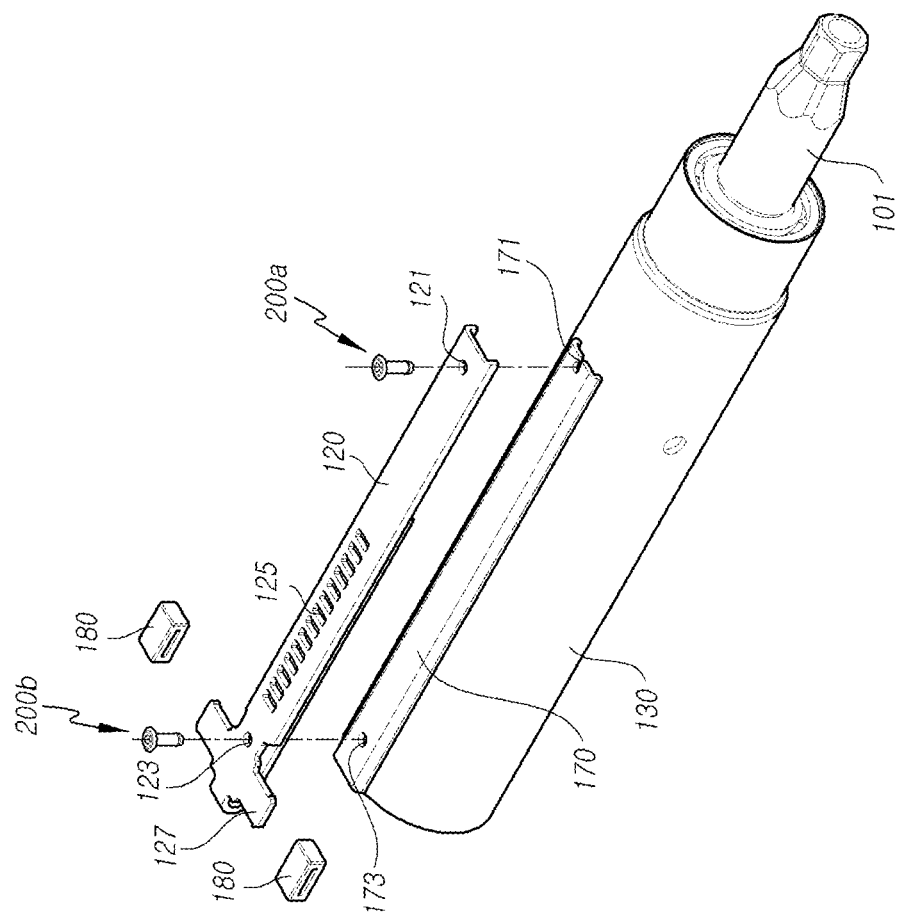
FIG. 7 is an exploded perspective view illustrating portions of the vehicle steering column according to embodiments.
Figure 8:
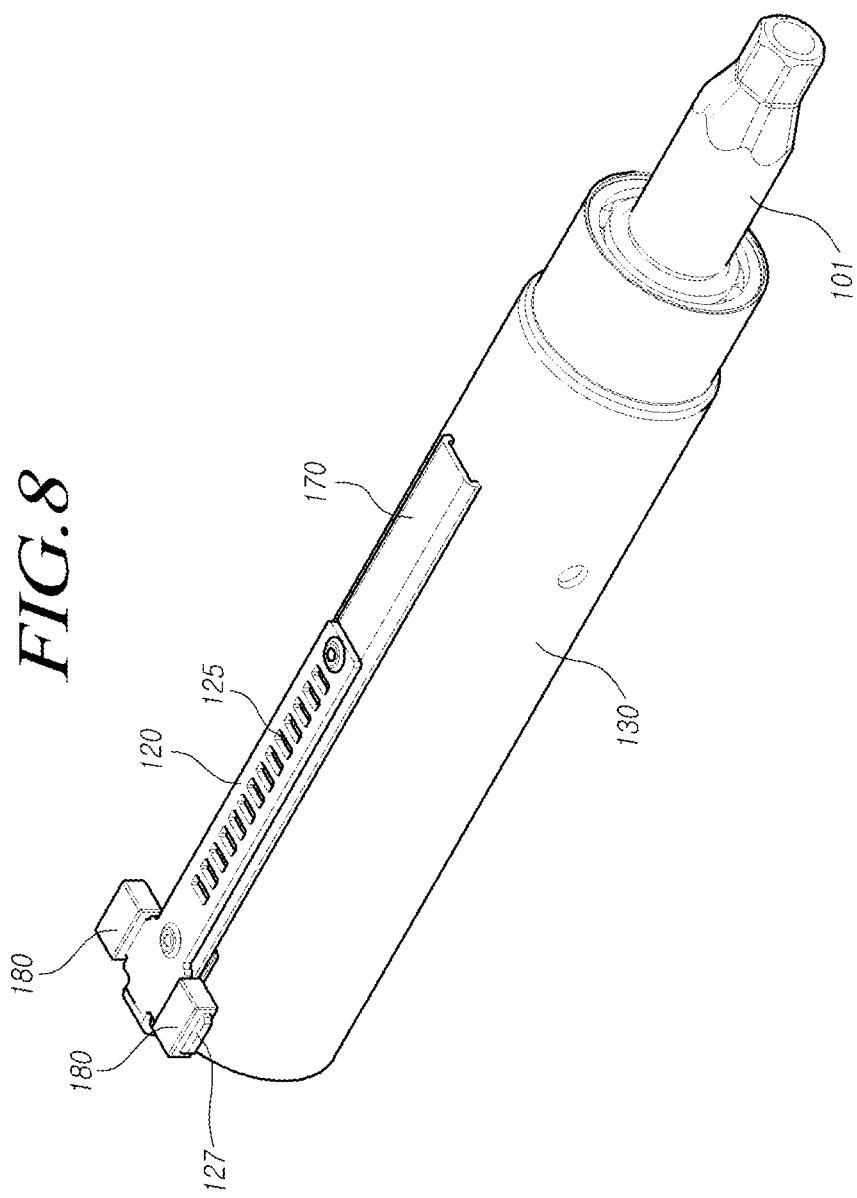
FIG. 8 is a perspective view illustrating portions of the vehicle steering column according to embodiments.
Figure 9:
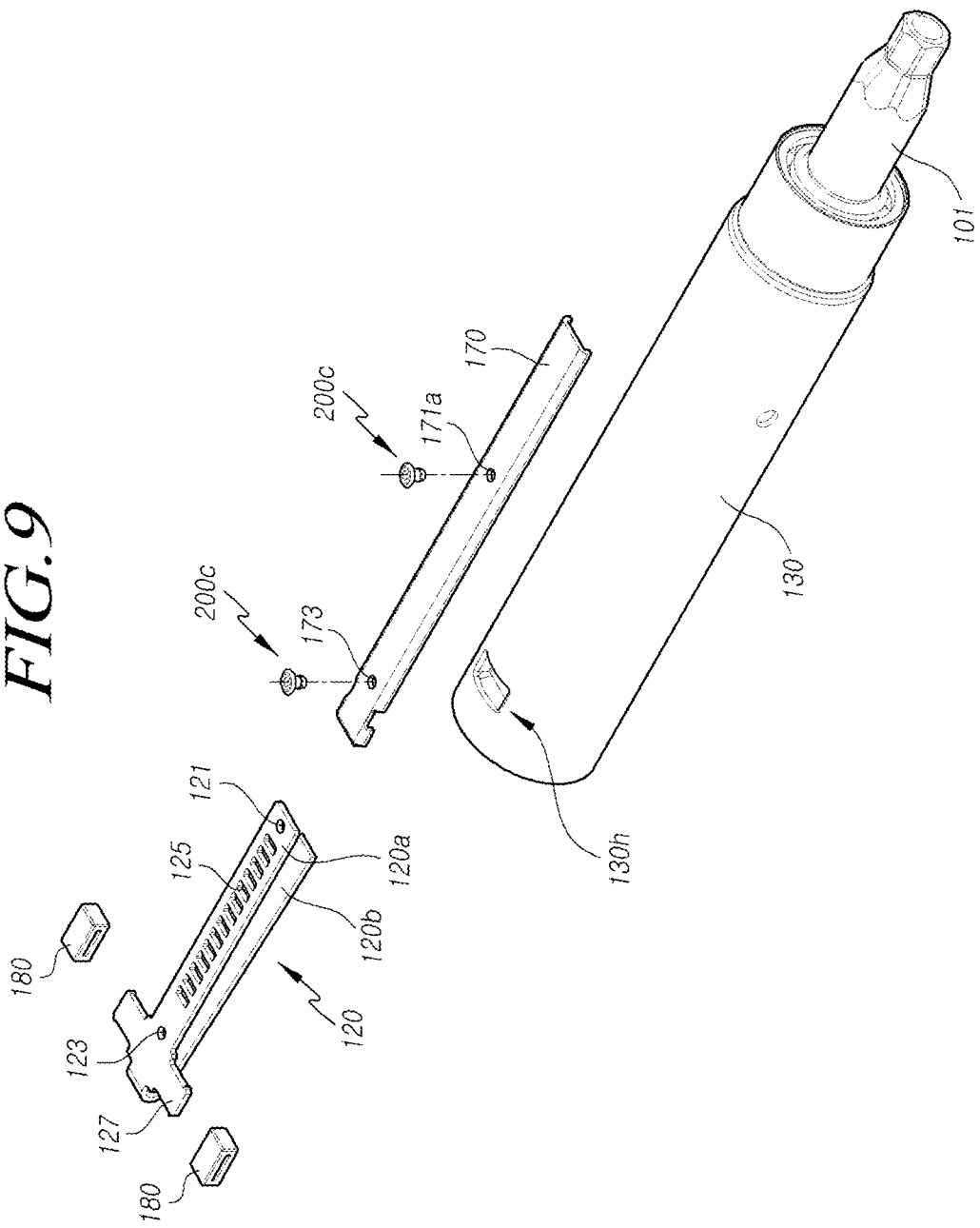
FIG. 9 is an exploded perspective view of FIG. 8.
Figure 10:
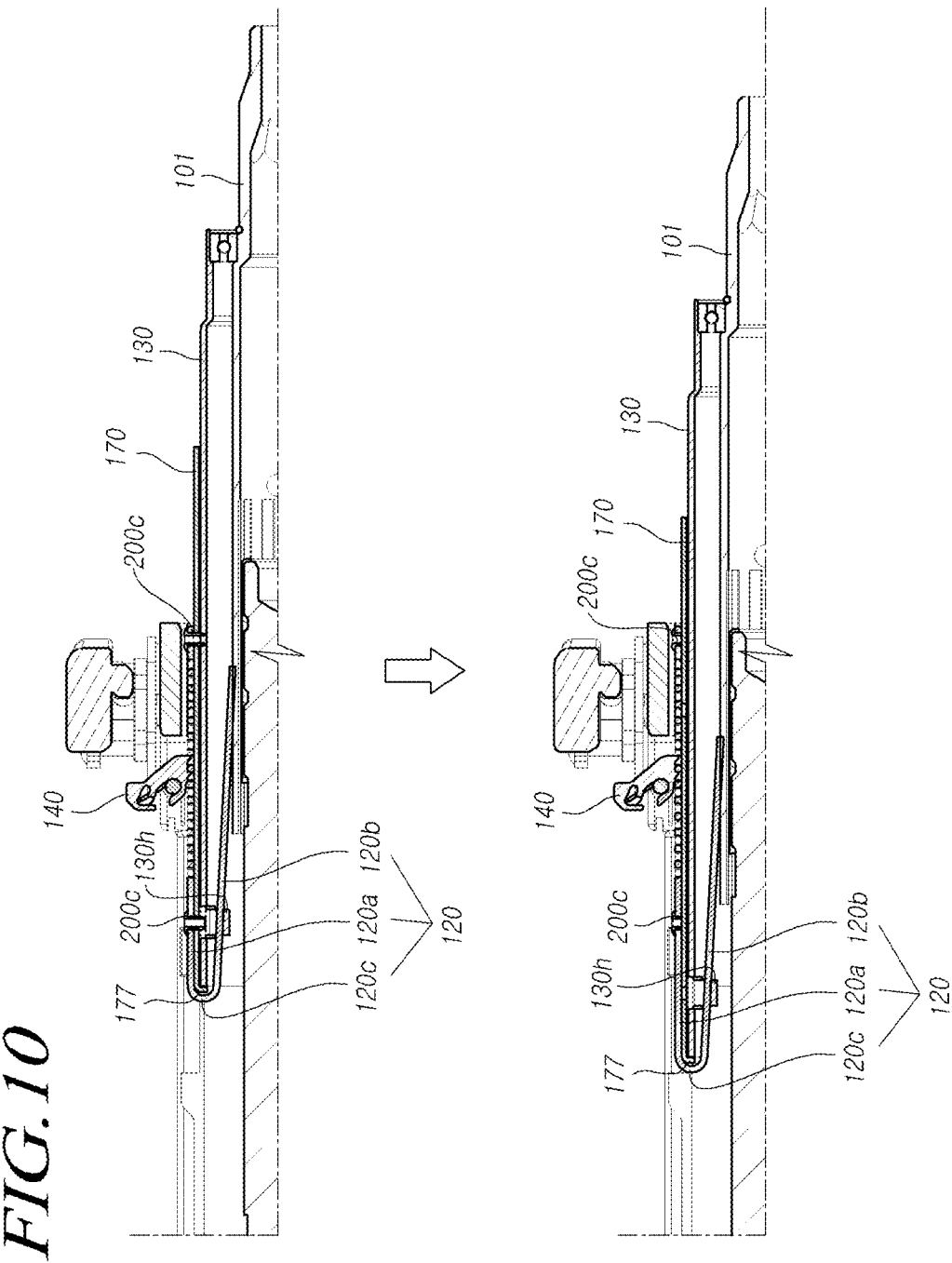
FIG. 10 is a partial cross-sectional view illustrating collapse sliding of the vehicle steering column according to embodiments.
Figure 11:
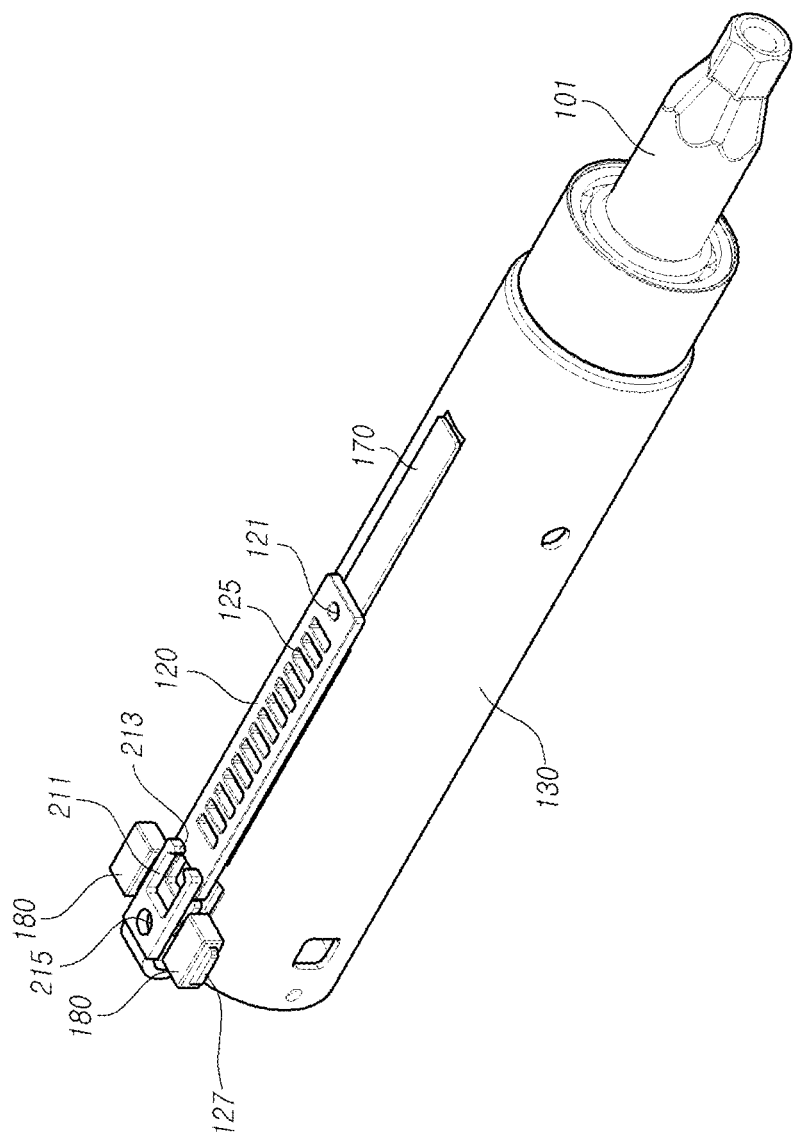
FIG. 11 is a perspective view illustrating portions of the vehicle steering column according to embodiments.
Figure 12:
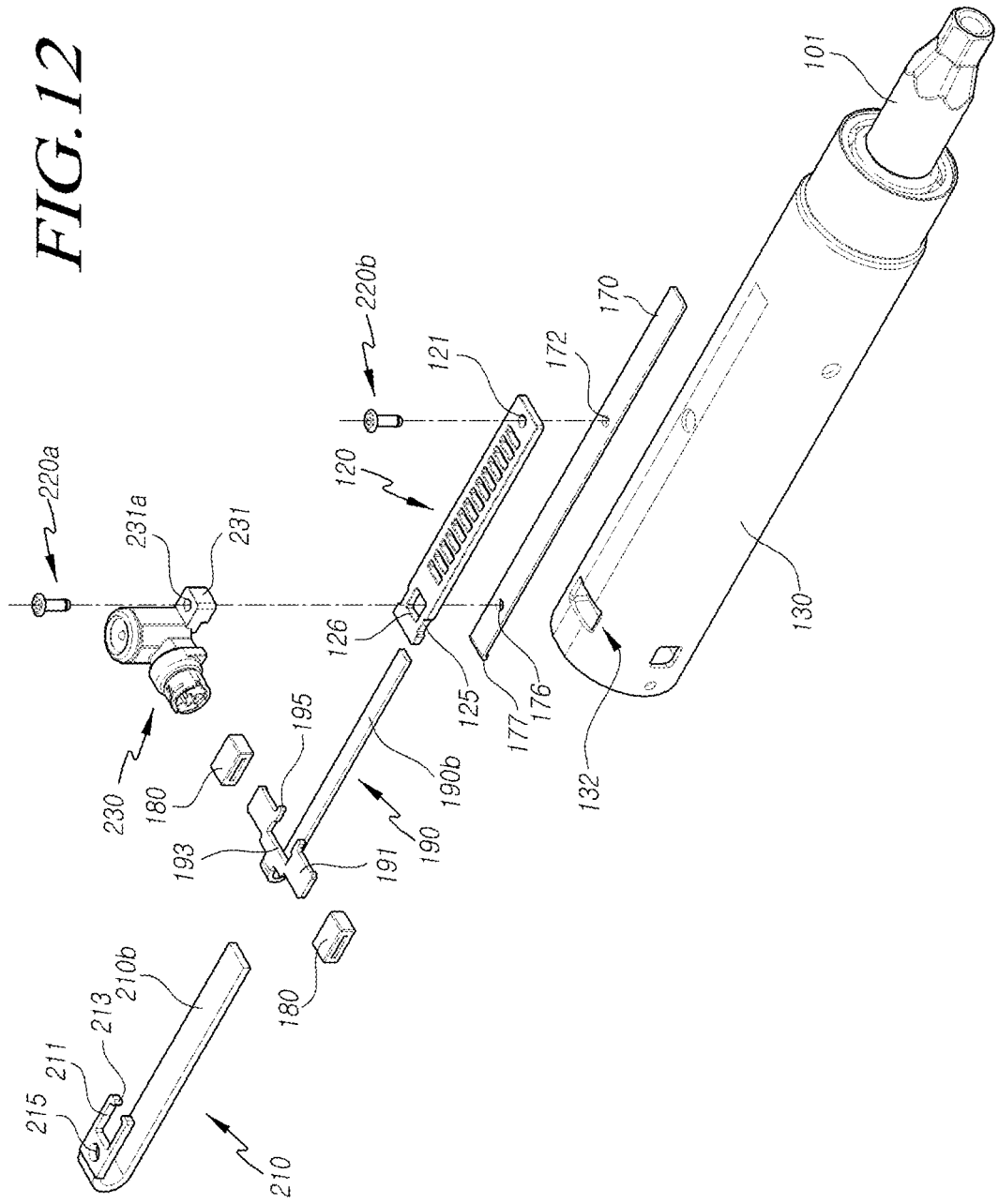
FIG. 12 is an exploded perspective view of FIG. 11.

FIG. 1 is a perspective view illustrating a vehicle steering column according to embodiments, FIG. 2 is an exploded perspective view of FIG. 1, FIGS. 3 and 4 are perspective views illustrating portions of the vehicle steering column according to embodiments, FIG. 5 is an exploded perspective view illustrating portions of the vehicle steering column according to embodiments, FIG. 6 is a perspective view illustrating the vehicle steering column according to embodiments, FIG. 7 is an exploded perspective view illustrating portions of the vehicle steering column according to embodiments, FIG. 8 is a perspective view illustrating portions of the vehicle steering column according to embodiments, FIG. 9 is an exploded perspective view of FIG. 8, FIG. 10 is a partial cross-sectional view illustrating collapse sliding of the vehicle steering column according to embodiments, FIG. 11 is a perspective view illustrating portions of the vehicle steering column according to embodiments, FIG. 12 is an exploded perspective view of FIG. 11, and FIGS. 13 and 14 are partial cross-sectional views illustrating collapse sliding of the vehicle steering column according to embodiments.

As illustrated in the drawings, a vehicle steering column 101 according to embodiments may include a lower column 150, an upper column 130, and a telescopic catch member 140. The lower column 150 has an open area or opening 151 provided in an outer circumferential portion of the lower column 150. An axial slot 153 is provided in the central portion of the open area 151. A connecting portion 155 is provided on one end portion to connect portions of the lower column 150 located on both sides of the open area 151 to cover the opening or open area 151. A cut portion 157 corresponding to the slot 153 is provided on one side of the connecting portion 155. A pair of projections or opposite end portions 159a and 159b protrude to face each other in a diameter direction of the lower column 130 (for example, a direction perpendicular to an axis of a steering column 101), such that a hinge pin 160 is fitted into, while extending through, the opposite end portions 159a and 159b. The upper column 130 is fitted into the lower column 150. For example, the upper column 130 is movable or slidable inside the lower column 150. The upper column 130 includes a telescopic fixing plate 120 provided on an outer circumferential surface portion of the upper column 130, corresponding to the slot 153 of the lower column 150. A plurality of catch recesses 125 are provided in or on the telescopic fixing plate 120 and spaced apart from each other in the axial direction, such as a direction of an axis of the steering column 101. The telescopic catch member 140 is located in the cut portion 157 of the lower column 150 between the opposite end portions 159a and 159b to be rotatably supported by the hinge pin 160. The telescopic catch member 140 has one or more catch protrusions 141 engaging with the catch recesses 125 of the upper column 130.

The vehicle steering column 101 may be, for example, but not limited to, a steering column for a vehicle, in which the upper column 130 fitted into the lower column 150 can move telescopically or slidably in an axial direction. The vehicle steering column 101 may have a structure allowing the upper column 130 to be collapsed toward the lower column 150 to absorb collision energy in the event of a crash.

The open area 151 is provided in the outer circumferential portion of the lower column 150, the axial slot 153 is provided in the central portion of the open area 151, the connecting portion 155 is provided on one end portion to connect portions of the lower column 150 located on both sides of the open area 151, the cut portion 157 corresponding to the slot 153 is provided on one side of the connecting portion 155, and the opposite end portions 159a and 159b protrude to face each other in the diameter direction of the lower column 130.

In addition, the hinge pin 160 acting as the center of rotation of the telescopic catch member 140, described above, is fitted or fixed into the opposite end portions 159a and 159b. The telescopic catch member 140 is operably connected with or supported by an adjustment lever 103 to be rotatable via the hinge pin 160 when the adjustment lever 103 is operated.

The upper column 130 is provided outside of the steering column 101. The steering column 101 is configured to transmit steering force in response to the driver's manipulation of a steering wheel. The upper column 130 may be retracted into and/or withdrawn from the lower column 150 when a telescopic operation is performed. The upper column 130 is fitted into the lower column 150 so as to be able to collapse or slide toward the lower column 150, when appropriate or necessary (for example, the event of a crash).

The lower column 150 is fixed to a vehicle chassis via a plate bracket 105 and a mounting bracket 107. The plate bracket 105 has tilt slits 105a, through which an adjustment bolt 109 passes or extends.

The upper column 130 has a hollow structure, and is fitted into the inner circumference of the lower column 150 to be slidable axially into the lower column 150 in the event of the collapse operation.

The telescopic fixing plate 120 is provided on the outer circumferential surface portion of the upper column 130, in a position corresponding to the slot 153 of the lower column 150. The telescopic fixing plate 120 has the plurality of catch recesses 125 spaced apart from each other in the axial direction, such as a direction of an axis of the steering column 101. In the telescopic operation, the telescopic catch member 140 moves telescopically while being repeatedly attached to and detached from the catch recesses 125. In the event of a crash, the upper column 130 may move with the telescopic catch member 140 being coupled to the telescopic fixing plate 120. In this manner, a collapsing movement is performed.

The telescopic catch member 140 is located in the cut portion 157 between the opposite end portions 159a and 159b of the lower column 150. The telescopic catch member 140 is configured to be rotatable while being supported by the hinge pin 160. The catch protrusion(s) 141, which can be coupled to or inserted into the catch recesses 125 of the telescopic fixing plate 120, is provided on, for example, but not limited to, one end portion of the telescopic catch member 140.

In addition, a coupling hole 158 is provided in one of the opposite end portions 159a and 159b, for example, the end portion 159a. The hinge pin 160 is press-fitted into the coupling hole 158. As illustrated in FIGS. 3 to 5, the coupling hole 158, into which the hinge pin 160 is press-fitted, may be provided in one end portion, i.e. the end portion 159a, of the opposite end portions 159a and 159b, while a support surface 156, on which the hinge pin 160 is supported, may be provided on the other end portion, i.e. the end portion 159b, of the opposite end portions 159a and 159b.

In this case, the support surface 156 is provided to be open from the edge of the end portion 159b to the cut portion 157 in the axial direction of the hinge pin 160, such that the hinge pin 160 can be easily press-fitted into the coupling hole 158. The other end of the hinge pin 160 is fixed to, while being supported on, the stepped portion between the support surface 156 and the opposite end portions 159a and 159b.

The telescopic catch member 140 has a hinge hole 143 into which the hinge pin 160 is fitted. In addition, the catch protrusion 141, which can be inserted or fitted into the catch recesses 125 of the telescopic fixing plate 120, is provided on one end portion of the telescopic catch member 140 spaced apart from the hinge hole 143.

In addition, a seating recess 145 is provided on the other end portion of the telescopic catch member 140 spaced apart from the hinge hole 143 of the telescopic catch member 140. A seating portion 115a of an elastic member 115 is seated on or operably coupled to the seating recess 145 of the telescopic catch member 140. Support recesses 159c are respectively provided in one edge of each of the opposite end portions 159a and 159b. End portions (or coupling portions) 115b of the elastic member 115 are received in and supported by, or operably contacts, the support recesses 159c to elastically support the telescopic catch member 140.

Thus, the end portions 115b of the elastic member 115 are supported by the support recesses 159c in the opposite end portions 159a and 159b of the lower column 150, and the elastic member 115 causes one end portion of the telescopic catch member 140 to rotate about the hinge pin 160, so that the catch protrusion 141 is elastically supported to remain caught by the catch recesses 125. The elastic member 115 is configured to urge to rotate one end portion of the telescopic catch member 140 toward the lower column 150 so that the catch protrusion 141 of the telescopic catch member 140 can be inserted into or coupled to the catch recesses 125 of the lower column 150.

In addition, when the telescopic operation is necessary, a vehicle operator such as a driver can rotate the adjustment lever 103 so that an operating protrusion 103a of the adjustment lever 103 rotates an end portion of the telescopic catch member 140 in the opposite direction while supporting the other end portion of the telescopic catch member 140, so that the catch protrusion 141 is released from the catch recesses 125.

In addition, a distance bracket 170 is provided on an outer circumferential surface of the upper column 130 to be detachably coupled to the telescopic fixing plate 120. The distance bracket 170 is detachable from the telescopic fixing plate 120 in the event of a crash.

FIG. 7 illustrates one exemplary embodiment of the present disclosure. As illustrated in FIG. 7, a slit hole 171 is provided in one end portion of the distance bracket 170 to be opened in the axial direction. For example, the slit hole 171 has a slit opened at the side of the distance bracket 170 in a direction of an axis of the steering column 101. A first fastening hole 121 is provided in one end portion 120a of the telescopic fixing plate 120 at the location corresponding to the slit hole 171 of the distance bracket 170. The first fastening hole 121 is aligned with the slit hole 171. A first fastening member 200a passes through both the first fastening hole 121 and the slit hole 171 and is coupled to the first fastening hole 121 and the slit hole 171.

Accordingly, in the event of a crash, the upper column 130 and the distance bracket 170 move while collapsing in the axial direction, so that the first fastening member 200a can be detached from the slit hole 171 through the slit of the slit hole 171 opened at the side of the distance bracket 170.

In addition, a second fastening hole 123 is provided in the other end portion of the telescopic fixing plate 120 which is opposite to the end portion of the telescopic fixing plate 120 that the first fastening hole 121 is formed. The coupling hole 173 is provided in the other end portion of the distance bracket 170 at the location corresponding to the second fastening hole 123. The coupling hole 173 is aligned with the second fastening hole 123. A second fastening member 200b passes through both the second fastening hole 123 and the coupling hole 173, and is coupled to the second fastening hole 123 and the coupling hole 173. In the event of a crash, the upper column 130 and the distance bracket 170 are moved in the axial direction, and the second fastening member 200b can be sheared (or torn or broken) by the collapsing movement of the upper column 130 and the distance bracket 170 to absorb shock.

In addition, the other end portion 120b of the telescopic fixing plate 120 has a bent portion 120c which is bent and extends toward one end portion of the telescopic fixing plate 120 while being bent around the other end portion of the distance bracket 170.

Accordingly, in the event of a crash, the upper column 130 performs the collapse movement by breaking or shearing the second fastening member 200b coupled to the second fastening hole 123. The distance bracket 170 moving along with the upper column 130 is moved axially while supporting the bent portion of the telescopic fixing plate 120, so that the bent portion of the telescopic fixing plate 120 is plastically deformed while being spread, thereby absorbing a shock caused by a crash.

In addition, extensions 127 may be provided on the other end portion of the telescopic fixing plate 120 to extend laterally in opposite directions to each other. For example, the extensions 127 protrude from the sides of the other end portion of the telescopic fixing plate 120 in a direction perpendicular to an axis of the steering column 101. The lower column 150 includes telescopic stoppers 152 provided on opposite sides of the slot 153 of the open area 151 to support the extensions 127 of the telescopic fixing plate 120. In the telescopic operation, the extensions 127 of the telescopic fixing plate 120, moving along with the upper column 130, can be stopped or supported by the telescopic stoppers 152 to limit the movable range or distance of the telescopic movement. The telescopic stoppers 152 may limit the movement of the extensions 127 of the telescopic fixing plate 120.

On the telescopic extensions 127, Damping members 180 may be disposed on the telescopic extensions 127. The damping members 180 is configured to be elastically deformable while contacting or being supported by the telescopic stoppers 152. Accordingly, the damping members 180 may absorb collision shock and reduce noise when the telescopic operation is stopped.

FIGS. 8 and 9 show another exemplary embodiment of the present disclosure. As illustrated in FIGS. 8 and 9, tearable or breakable bolts 200c can be used to detachably couple the telescopic fixing plate 120 to the distance bracket 170. The tearable or breakable bolts 200c can hold the telescopic fixing plate 120 and the distance bracket 170 together, but when a certain amount of force, for example, force corresponding to collision or car accident is applied to the tearable or breakable bolts 200c, the bolts 200c can be torn or broken like the second fastening member 200b of FIG. 7.

In this case, a fastening hole 171a may be provided between end portions of the distance bracket 170. For example, the fastening hole 171a is disposed adjacent to a position where the slit hole 171 is formed in another embodiment of FIG. 7. One of the tearable bolts 200c is inserted or fitted into the first fastening hole 121 of the telescopic fixing plate 120.

In addition, the second fastening hole 123 is provided in the other end portion of the telescopic fixing plate 120, and the coupling hole 173 corresponding to or aligned with the second fastening hole 123 of the fixing plate 120 is provided in the other end portion of the distance bracket 170, such that the other tearing bolt 200c is inserted or fitted into the second fastening hole 123 and the coupling hole 173.

As illustrated in FIG. 10, in response to a crash, the upper column 130 and the distance bracket 170 are collapsed by moving in the axial direction such as a direction of an axis of the steering column 101, and the tearing bolts 200c are torn to absorb shock, so that the upper column 130 can be moved for collapse.

FIGS. 9 and 10 illustrate a still another embodiment of the present disclosure. As illustrated in FIGS. 9 and 10, a holder 130h may be provided on the outer circumference surface of the upper column 130. The holder 130h may be formed by cutting one axial end portion of the upper column 130 and bending the cut portion of the upper column 130 inward so as to be depressed.

Alternatively, the holder 130h may be formed by adding or connecting a separate member to the upper column 130. The holder 130h allows the other bent end portion of the telescopic fixing plate 120 to be fitted thereinto and supported thereby, so that the telescopic fixing plate 120 is rested in a proper position instead of being offset to or moving any direction in the event of a crash.

FIGS. 11 and 12 show a still another embodiment of the present disclosure. As illustrated in FIGS. 11 and 12, a separate first bending member 190 may be added. The first bending member 190 has a separate structure from the telescopic fixing plate 120 and is coupled to the telescopic fixing plate 120 to absorb shock through plastic deformation of a bent portion of the first bending member 190.

One end portion of the first bending member 190 is coupled to one end portion of the telescopic fixing plate 120 and the other end portion of the first bending member 190 is bent and extends toward the other end portion of the telescopic fixing plate 120 while being bent around an end portion of the distance bracket 170.

In addition, a coupling hole 172 is provided in the other end portion of the distance bracket 170, and the first fastening hole 121 is provided in the other end portion of the telescopic fixing plate 120 at the position corresponding to the coupling hole 172 of the distance bracket 170. The fastening hole 121 may be aligned with the coupling hole 172. A shear fastening member (or tearable fastening member) 220b is fitted into the first fastening hole 121 and the coupling hole 172. The shear fastening member 220b may be torn in the event of a crash.

The distance bracket 170 may have a support 177 provided on a distal end portion of the distance bracket 170 in contact with the bent portion of the first bending member 190. The support 177 may be configured to support and bend, while being in tight contact with, the first bending member 190. The portion of the support 177 which is in contact with the bent portion of the first bending member 190 may be curved to prevent from being stamped by or caught by the first bending member 190 in the event of a crash. Alternatively, a separate curved member may be coupled to the distal end portion of the distance bracket 170.

The first bending member 190 may have extension supports 191 on one end portion of the first bending member 190 coupled to the telescopic fixing plate 120. The extension supports 191 may extend laterally in opposite directions to each other. For example, the extension supports 191 protrude from the sides of one end portion of the first bending member 190 in a direction perpendicular to an axis of the steering column 101. The lower column 150 may have the telescopic stoppers 152 provided on opposite sides of the slot 153 of the open area 151 to support the extension supports 191 or to limit the movable range of the extension supports 191 or to stop the extension supports 191 at a certain location.

In addition, the damping members 180 may be disposed on the extension supports 191 so as to be elastically deformable while contacting or being supported by the telescopic stoppers 152, as described above.

In addition, an insertion recess 193 is provided in one end portion of the first bending member 190. The other end portion of the telescopic fixing plate 120 is inserted into and disposed in the insertion recess 193. Accordingly, the falling out or release of the first bending member 190 from the telescopic fixing plate 120 may be prevented.

The insertion recess 193 has an opening at one end portion of the first bending member 190. The width of the insertion recess 193 may increase away from the opening of the insertion recess 193 so that the insertion recess 193 can have stepped structures or portions in the inner surface of the insertion recess 193. The other end portion of the telescopic fixing plate 120, coupled to the insertion recess 193, has protrusions extending laterally in opposite directions to each other. The protrusions of the telescopic fixing plate 120 are inserted into the stepped structures or portions of the insertion recess 193. Accordingly, the other end portion of the telescopic fixing plate 120 can be securely coupled to the insertion recess 193, and the falling off or release of the telescopic fixing plate 120 from the first bending member 190 may be prevented.

In addition, support protrusions 195 are provided on one edge of the first bending member 190 to extend inward in a lateral direction while facing each other. Fitting recesses 125 are provided in edge portions of the telescopic fixing plate 120, such that the support protrusions 195 of the first bending member 190 are coupled to the fitting recesses 125.

Accordingly, the first bending member 190 can be firmly coupled to the telescopic fixing plate 120 and may not be fell off from the telescopic fixing plate 120.

In addition, as illustrated in FIGS. 11 and 12, a second bending member 210 may be provided to selectively increase the ability to absorb the collision energy of a vehicle.

One end portion of the second bending member 210 is supported by the upper end portion of the telescopic fixing plate 120 and/or the upper end portion of the first bending member 190 and the other end portion of the second bending member 210 extends toward one end portion of the telescopic fixing plate 120 while being bent around the first bending member 190.

In addition, an actuator 230 is configured to couple or decouple the second bending member 210 to or from the telescopic fixing plate 120.

A fork-shaped portion 211 is provided on one end portion of the second bending member 210. Protrusions 213 protrude inward from distal ends of the prongs of the fork-shaped portion 211, respectively, to face each other. An insertion portion 231 of the actuator 230 is inserted into or passed through a space between, or formed by, the fork-shaped portion 211 and the protrusions 213 and coupled to the telescopic fixing plate 120 using a shearable coupler or shear coupling member 220a.

The insertion portion 231 of the actuator 230 has a shape corresponding to the space formed by the fork-shaped portion 211 and the protrusions 213. For example, the insertion portion 231 of the actuator 230 is tightly fitted in the space defined by the fork-shaped portion 211 and the protrusions 213. The shear coupling member 220a is passed through and coupled to a coupling hole 231a of the insertion portion 231, a communication hole 126 of the telescopic fixing plate 120 and a first hole 176 of the distance bracket 170. In the event of a crash, the shear coupling member 220a may be sheared or broken and the insertion portion 231 of the actuator 230 is released from the space between the second bending member 210 of the fork-shaped portion 211, thereby causing the upper column 130 and the distance bracket 170 to collapse.

In addition, while the insertion portion 231 of the actuator 230 is being released from the space between the second bending member 210 of the fork-shaped portion 211, the fork-shaped portion 211 of the second bending member 210 may be deformed, i.e. the prongs of the fork-shaped portion 211 move outwardly in opposite directions to spread laterally or more wide.

A support hole 215 is provided in one end portion of the second bending member 210, and an actuator pin 233 is coupled to the support hole 215. The actuator pin 233 may be retracted into and withdrawn from the actuator 230. In response to a signal transmitted by an electronic control unit (ECU) depending on whether or not an impact load measured by a variety of sensors mounted on a vehicle exceeds a reference value, the actuator pin 233 of the actuator 230 may be inserted into or released from the support hole 215, allowing or causing the second bending member 210 to absorb collision energy.

In addition, the insertion portion 231 of the actuator 230 may be released from between the prongs of the fork-shaped portion 211, so that the second bending member 210 does not absorb collision energy, i.e. the second bending member 210 is not plastically deformed.

That is, if the impact load caused by the collision or crash of the vehicle does not exceed a reference value, the actuator pin 233 of the actuator 230 may be released from the support hole 215 in response to the signal transmitted by the ECU. The distance bracket 170, configured to collapse together with the upper column 130 in the event of a crash, collapses while plastically deforming the first bending member 190. Then, the insertion portion 231 of the actuator 230 is released from the space between the prongs of the fork-shaped portion 211 of the second bending member 210, so that the bending member 210 can be slid along with upper column 130, instead of being plastically deformed.

An example of such a collision energy absorption process is illustrated in FIGS. 13 and 14. FIG. 13 illustrates a situation in which both the first bending member 190 and the second bending member 210 absorb collision energy, while FIG. 14 illustrates a situation in which only the first bending member 190 absorbs collision energy while the second bending member 210 is slid.

First, referring to FIG. 13 together with FIGS. 11 and 12, in the event of a collision, one end portion of the second bending member 210 remains restrained and fixed by the actuator 230 and telescopic fixing plate 120 during the collapse movement of the upper column 130, since the actuator pin 233 of the actuator 230 is coupled to the support hole 215 of the second bending member 210.

Accordingly, the impact is absorbed by plastic deformation in which the bent portions of the first bending member 190 and the second bending member 210 are unbent by the support 177 of the distance bracket 170.

Next, referring to FIG. 14 together with FIGS. 11 and 12, in the event of a collision, the actuator pin 233 of the actuator 230 is detached from the support hole 215 of the second bending member 210, and the insertion portion 231 of the actuator 230 is released from the space between the prongs of the fork-shaped portion 211 of the second bending member 210. Accordingly, the second bending member 210 is slid along with the upper column 130, instead of being plastically deformed.

According to some embodiments of the present disclosure having the above-described structures and shapes, the components for the telescopic operation and the components collapsing in the event of a crash may efficiently operate without interfering with each other while having compact sizes.

In addition, according to certain embodiments of the present disclosure, the adjustment of the collapsing load of the steering column in the event of a crash is facilitated, and at the same time, the collapsing load is adjusted according to the type-specific collision properties of vehicles, thereby improving collision performance. The number of components may be reduced, an assembly process can be simplified, and manufacturing and fabrication costs may be reduced.

Although all of the components constituting the foregoing embodiments have been described as being combined together or as operating in concert with each other, the embodiments are not necessarily limited thereto. Rather, one or more components may be selected from the entire components to be combined together and operate in a combined form within the scope of the embodiments.

It will be understood that the terms "comprise", "include", "have", and any variations thereof used herein are intended to cover non-exclusive inclusions unless explicitly described to the contrary. Unless otherwise specified, all terms including technical and scientific terms used herein have the same meaning as that commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those having ordinary knowledge in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle steering column comprising:
a lower column having an axial slot positioned in the lower column, an opening provided in an outer circumferential portion of the lower column to expose the axial slot outside of the lower column, a connecting portion covering a portion of the opening of the lower column and having a cut portion provided on one side of the connecting portion, and a pair of projections protruding from the outer circumferential portion of the lower column, wherein a hinge pin is coupled to the pair of projections;
an upper column disposed in the lower column, wherein a telescopic fixing plate is provided on an outer circumferential surface of the upper column in a location corresponding to the slot of the lower column, the telescopic fixing plate having a plurality of catch recesses spaced apart from each other in an axial direction of the upper column; and
a telescopic catch member located in the cut portion of the connecting portion of the lower column and rotatably supported between the pair of projections of the lower column by the hinge pin, the telescopic catch member having a catch protrusion engageable with one or more of the catch recesses of the telescopic fixing plate.

2. The vehicle steering column according to claim 1, wherein a coupling hole, to which the hinge pin is coupled, is provided in one of the pair of the projections of the lower column.

3. The vehicle steering column according to claim 1, wherein one end of the hinge pin is coupled to a coupling hole provided in one of the pair of projections of the lower column, and another end of the hinge pin is supported by a support surface provided in another of the pair of the projections of the lower column.

4. The vehicle steering column according to claim 1, wherein a support recess is provided in an edge of each of the pair of projections of the lower column, and an elastic member elastically supporting the telescopic catch member is coupled to the support recess of the projections of the lower column.

5. The vehicle steering column according to claim 1, further comprising a distance bracket provided on an outer circumferential surface of the upper column, wherein the distance bracket is detachably coupled to the telescopic fixing plate.

6. The vehicle steering column according to claim 5, wherein a slit hole is provided in one end portion of the distance bracket and has a slit opened in the axial direction of the upper column, a first fastening hole is provided in one end portion of the telescopic fixing plate and aligned with the slit hole of the distance bracket, and a first fastening member is coupled to the first fastening hole of the telescopic fixing plate and the slit hole of the distance bracket.

7. The vehicle steering column according to claim 6, wherein a second fastening hole is provided in an other end portion of the telescopic fixing plate, a coupling hole is provided in an other end portion of the distance bracket and aligned with the second fastening hole of the telescopic fixing plate, and a second fastening member is coupled to the second fastening hole of the telescopic fixing plate and the coupling hole of the distance bracket.

8. The vehicle steering column according to claim 7, wherein the other end portion of the telescopic fixing plate extends toward the one end portion of the telescopic fixing plate and is bent around the other end portion of the distance bracket.

9. The vehicle steering column according to claim 8, wherein the other end portion of the telescopic fixing plate has extensions protruding from sides of the telescopic fixing plate in opposite directions, and the lower column has telescopic stoppers provided on opposite sides of the slot to limit movement of the extensions of the telescopic fixing plate.

10. The vehicle steering column according to claim 9, further comprising damping members provided on the extensions of the telescopic fixing plate and configured to be elastically deformable.

11. The vehicle steering column according to claim 5, further comprising a first bending member, wherein one end portion of the first bending member is coupled to one end portion of the telescopic fixing plate, and an other end portion of the first bending member extending toward an other end portion of the telescopic fixing plate.

12. The vehicle steering column according to claim 11, wherein a coupling hole is provided in an other end portion of the distance bracket, a first fastening hole is provided in the other end portion of the telescopic fixing plate is aligned with the coupling hole of the distance bracket, and a tearable bolt is coupled to the first fastening hole of the telescopic fixing plate and the coupling hole of the distance bracket.

13. The vehicle steering column according to claim 12, wherein the distance bracket has a curved support provided on a distal end portion of the distance bracket and contacting a bent portion of the first bending member, the curved support configured to support and bend the first bending member.

14. The vehicle steering column according to claim 11, wherein the first bending member has extension supports provided on the one end portion of the first bending member coupled to the telescopic fixing plate, the extension supports extending laterally in opposite directions, and the lower column has telescopic stoppers provided on opposite sides of the slot to limit movement of the extension supports of the first bending member.

15. The vehicle steering column according to claim 14, further comprising damping members provided on the extension supports configured to be elastically deformable.

16. The vehicle steering column according to claim 14, wherein an insertion recess is provided in the one end portion of the first bending member, the insertion recess comprises a portion opened toward the one end portion of the first bending member, a width of an other portion of the insertion recess is increased away from the opened portion of the insertion recess, stepped portions are formed between the opened portion and the other portion of the insertion recess, and the one end portion of the telescopic fixing plate has protrusions extending laterally in opposite directions.

17. The vehicle steering column according to claim 11, wherein the first bending member has support protrusions provided on one edge of the first bending member to extend inward and facing each other, and the telescopic fixing plate has fitting recesses provided in edge portions of the telescopic fixing plate, such that the support protrusions of the first bending member are coupled to the fitting recesses of the telescopic fixing plate.

18. The vehicle steering column according to claim 11, further comprising a second bending member, wherein one end portion of the second bending member is supported by the telescopic fixing plate and the first bending member, and an other end portion of the second bending member extends toward the other end portion of the telescopic fixing plate.

19. The vehicle steering column according to claim 18, wherein the second bending member has a fork-shaped portion provided on the one end portion of the second bending member, the second bending member comprises protrusions protruding inward from distal ends of prongs of the fork-shaped portion to face each other, and an insertion portion of an actuator is disposed in a space between the prongs of the fork-shaped portion of the second bending member and coupled to the telescopic fixing plate using a shearable coupler.

20. The vehicle steering column according to claim 19, wherein a support hole is provided in the one end portion of the second bending member, and an actuator pin is coupled to the support hole of the second bending member, the actuator pin configured to be retractable into and withdrawable from the actuator.

* * * * *